Jan. 11, 1944.   C. H. ZIERDT, JR   2,338,890
ELECTRICAL RECTIFIER
Filed July 12, 1941

Copper
Copper Oxide

INVENTOR
Conrad H. Zierdt Jr.
BY
HIS ATTORNEY

Patented Jan. 11, 1944

2,338,890

UNITED STATES PATENT OFFICE 2,338,890

ELECTRICAL RECTIFIER

Conrad H. Zierdt, Jr., Rosedale, Pa., assignor to The Union Switch & Signal Company, Swissvale, Pa., a corporation of Pennsylvania Application July 12, 1941, Serial No. 402,154

10 Claims. (Cl. 175—366)

My invention relates to electrical rectifiers, and particularly to electrical rectifiers of the dry disc type.

One well-known form of dry disc rectifier comprises a copper washer having a coating of copper oxide formed on one or both sides thereof. In commercial rectifiers of this type, the oxidized washers are frequently stacked on an insulated bolt under pressure with a lead washer in contact with each oxide surface. It is essential that the lead washers should not extend past the edges of the contiguous oxide surfaces into contact with the mother copper of the rectifier washers because a short circuit would result, and to this end the lead washers are usually made with a somewhat larger inside diameter and a somewhat smaller outside diameter than the rectifier washers. This construction effectively prevents short circuits as long as the lead washers are properly centered during assembly. However, in assembling rectifiers of this type it is difficult to properly center the lead washers, and when a washer is not properly centered and the necessary stack pressure is applied, there is always the danger that the non-centered washer will be squeezed past the edge of the contiguous oxide surface into contact with the associated rectifier washer and thus cause a short circuit.

One object of my present invention is to provide a novel and improved method and/or means for insuring that the lead washers will be properly centered in rectifiers of the type described.

According to my invention, I attach the lead washers, by heat and pressure prior to assembling them into the stacks, to auxiliary metal washers having a higher melting point than the lead washers and having the same inside diameter as the rectifier washers and the same outside diameter as the lead washers, and I assemble one of the contact units thus formed in the rectifier stack at each point where it is desired to make contact with the oxide surface of a rectifier washer.

Other objects and characteristic features of my invention will become apparent as the description proceeds.

I shall describe one form of electrical rectifier embodying my invention, and one method and/or means for constructing it, and shall then point out the novel features thereof in claims.

Figure 1:
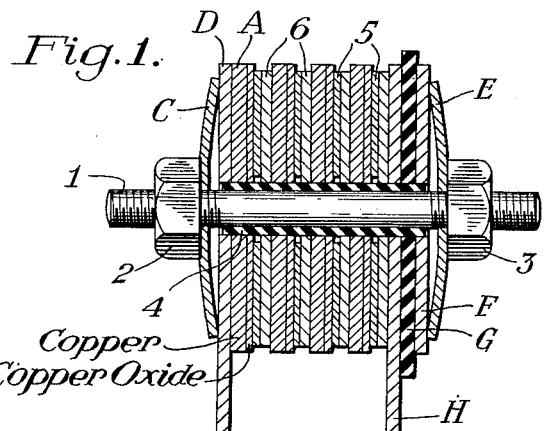
Figure 2:
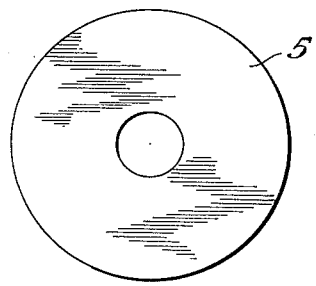
Figure 3:
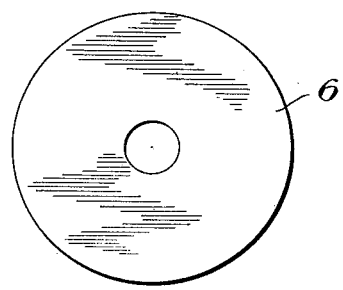
Figure 4:
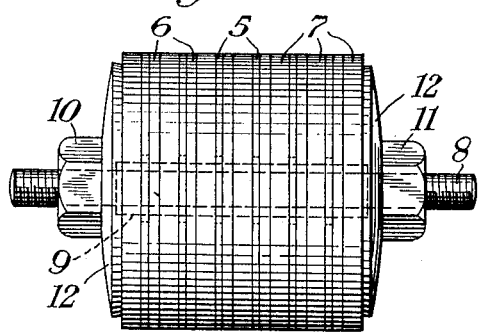
Figure 5:
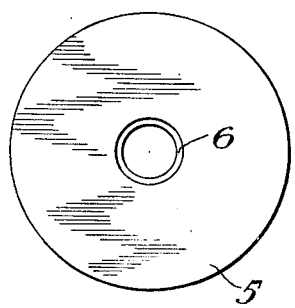
Figure 6:
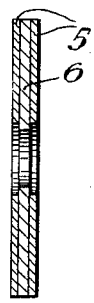

In the accompanying drawing, Fig. 1 is a vertical, longitudinal, sectional view showing one form of electrical rectifier embodying my invention. Figs. 2 and 3 are views showing certain parts of the rectifier assembly illustrated in Fig. 1. Fig. 4 is a side view showing a stack of contact washers as it appears during one step of the process embodying my invention. Fig. 5 is a plan view showing a completed contact unit embodying my invention. Fig. 6 is a vertical sectional view showing another form of contact unit embodying my invention.

Similar reference characters refer to similar parts in each of the several views.

Referring first to Fig. 1, the rectifier here illustrated comprises a plurality of asymmetric units A stacked on a bolt 1 provided with clamping nuts 2 and 3, and surrounded by an insulating sleeve 4 which insulates the units from the bolt. Each asymmetric unit, as here shown, is of the copper oxide variety, and comprises a copper washer oxidized on one side to provide a rectifying junction. Asymmetric units of this type are well known, and they exhibit the characteristic of offering a higher resistance to current which tends to flow from the copper to the oxide than to current which tends to flow in the opposite direction through the units.

In order to provide good electrical contact with the oxide surface of each asymmetric unit in a stack of the type described it is customary to place in contact with each oxide surface a soft metal washer, such for example, as the washer 5 shown in Fig. 2. It is essential that these washers should not extend past the edges of the contiguous oxide surface into contact with the mother copper of the associated asymmetric unit because a short circuit would result, and to prevent this from happening the washers 5 are usually constructed to have a larger inside diameter and a smaller outside diameter than the asymmetric units. With the contact washers constructed in this manner, it is still possible for a short circuit to occur, however, unless the contact washers are properly centered, since if a washer is not properly centered, the relatively high pressure which is applied to the rectifier stack by the nuts 2 and 3 may cause the portion of the inner edge of the contact washer 5 which is nearest to the sleeve 4 or the opposite portion of the outer edge or both to be crowded past the contiguous edge of the oxide into contact with the mother copper.

In accordance with my present invention, I provide a new and improved method and/or means for insuring that the contact washers will be properly centered with respect to the associated asymmetric unit, which method and means I shall now describe.

According to my invention, I employ in connection with each contact washer 5, an auxiliary contact washer 6 (Fig. 3) to which the washer 5 is secured by heat and pressure in a manner which I shall described in detail presently. The contact washers 5 are preferably of tin coated lead, and the auxiliary washers 6 may be constructed of any material possessing the necessary electrical conductivity provided it has a higher melting point than that of the tin coating on the washers 5, and provided further that it is fairly resistant to bending and cold flow under pressure. For example, the auxiliary contact washers may comprise copper or brass. The thickness of the auxiliary contact washers need be no greater than mechanical strength requires, and thicknesses of .010 or .015 inch have been found to give very satisfactory results. The auxiliary washers may be plated with .001 inch to .002 inch of tin, and when any metal other than copper is used, this plating appears to be necessary. However, when copper is used, this plating is not necessary. The auxiliary washers should, with the stack assemblies now generally used, have the same inside diameters as the asymmetric units and the same outside diameters as the contact washers 5 for a purpose shortly to be explained.

In securing the contact washers 5 to the washers 6, each washer 5 is placed in contact with one of the washers 6 in concentric relation under pressure, and sufficient heat is applied to produce the desired adhesion. This is feasible on a practical basis since the melting point of tin is about 232° C., the melting point of lead is about 327° C., and, as was pointed out hereinbefore, the washers 6 are constructed of a material which has a melting point which is equal to or greater than that of lead. While actual fusion does not occur below 232° C., tests indicate that good adhesion can be obtained between the washers 5 and 6 at temperatures as low as 100° C.

Where large numbers of washers 5 are to be secured to auxiliary washers 6, the washers may be stacked on a supporting bolt in the manner shown in Fig. 4, and baked in an oven. A contact washer 5 may be fused to either or both sides of each contact washer 6 as desired. Referring to Fig. 4, I have here shown a stack of contact washers ready to be fused made up of pairs of contact washers 5 and 6 separated by separating washers 7 assembled on a bolt 8. The bolt 8 is shown surrounded by a piece of insulating tubing 9 similar to that employed in the rectifier stack shown in Fig. 1 to facilitate removal of the contact units after baking, but if the bolt 8 has the proper diameter and is constructed of a material to which the washers 5 will not adhere, this tubing may be omitted. Pressure is applied to the ends of the stack by means of nuts 10 and 11 and spring washers 12, one of which is interposed in each end of the stack adjacent each nut. The separating washers may comprise any material which is hard, capable of being provided with a smooth surface, chemically inert, and able to withstand the desired fusing or "sticking" temperature without decomposing or flowing. It must not affect the tinned surfaces of the contact washers 5 and 6 in any way which will prevent a good contact from being formed between them. Graphite, anodized aluminum, and hard pressed asbestos have all been found to be suitable materials. It is essential that the contact washers 5 and 6 should be concentric before they are fused, and since the washers 5 and 6 have the same outside diameters this result can readily be obtained either by assembling the washers in a tube while they are being stacked, or by the operator sliding his hand down along the stack prior to tightening the nuts 10 and 11.

After the stack has been baked, it is disassembled, and it will be found that the washers 5 and 6 of each pair are "stuck" together sufficiently securely so that they can be readily handled without any danger of their separating. The resulting contact unit formed by securing the two washers 5 and 6 together appears as shown in Figs. 1 and 5.

A unit with a washer 5 stuck to both sides of a washer 6 is shown in Fig. 6.

In assembling a rectifier stack one of the contact units comprising a washer 5 stuck to a washer 6, or two washers 5 stuck to opposite sides of a washer 6, as the case may be, is interposed in the stack shown in Fig. 1 in such manner that one of the washers 5 is in contact with each oxide surface. Inasmuch as the washers 6 have the same inside diameters as the copper oxide washers, it will be seen that the washers 5 will automatically be centered with respect to the copper oxide washers. The washers 6 are prevented from contacting the copper of the associated copper oxide washer around the outer and inner edges of the copper oxide due to the fact that the washers 5 are sufficiently thick to prevent this contact.

Interposed between the nut 2 and the adjacent unit A of the stack shown in Fig. 1 is a spring washer C and a conducting plate D, and interposed between the nut 3 and the right-hand asymmetric unit A is a spring washer E, a pressure plate F, an insulating plate G, and a conducting plate H. The two spring washers C and E serve to maintain a uniform pressure on the asymmetric units and the contact units, whereby the contact units are firmly pressed into intimate contact with the oxide surfaces of the rectifier washers, while the two plates D and H serve as a means for making connection to a source of current supply. It should be noted that when a rectifier is connected to a source of current supply, the rectifier will offer a relatively low resistance to current flowing from plate H to plate D, and a relatively high resistance to current flowing in the opposite direction.

One advantage of electrical rectifiers embodying my invention is that freedom from short circuited stacks due to misplacement of the lead washers is assured.

Another advantage of rectifiers embodying my invention is that the contact units can be constructed at relatively low cost.

Although I have herein shown and described only one form of electrical rectifier embodying my invention, it is understood that various changes and modifications may be made therein within the scope of the appended claims without departing from the spirit and scope of my invention.

Having thus described my invention, what I claim is:

1. As a new article of manufacture a contact unit formed by uniting a tinned lead washer by heat and pressure to an auxiliary contact washer.

2. As a new article of manufacture a contact unit formed by uniting a tinned lead washer to a copper washer by means of heat and pressure.

3. A contact unit for use in making contact with the oxide surface of a copper oxide rectifier washer in a rectifier stack comprising a tinned lead washer secured by heat and pressure to one side of a metal washer having the same outside diameter as the lead washer and the same inside diameter as the rectifier washer.

4. A contact unit for use in making contact with the oxide surface of a copper oxide rectifier washer in a rectifier stack comprising a tinned lead washer secured by means of heat and pressure to an auxiliary contact washer.

5. A contact unit for use in making contact with the oxide surface of a copper oxide rectifier washer comprising a tinned lead washer secured by means of heat and pressure to a tinned metal washer.

6. The method of forming a contact unit for use in a rectifier stack of the type in which asymmetric units of the dry disc type are assembled on a through clamping bolt, said method comprising stacking a tinned lead washer and an auxiliary contact washer on a through bolt under pressure and applying sufficient heat to cause the lead washer to stick to the auxiliary contact washer.

7. The method of forming contact units for making contact with rectifier elements of the dry disc type which are assembled into a stack on a through bolt, said method comprising stacking pairs of tinned lead and auxiliary contact washers separated by separating washers on a bolt under pressure and applying sufficient heat to cause the two washers of each pair to stick together.

8. The method of forming contact units for making contact with rectifier elements of the dry disc type which are assembled into a stack on a through bolt, said method comprising stacking pairs of tinned lead and auxiliary contact washers separated by separating washers on a bolt under pressure and then baking the assembly thus formed at a temperature of between 100 and 250° C.

9. An electrical rectifier comprising a copper oxide rectifier washer assembled on a supporting bolt, and a contact unit disposed on said bolt in engagement with the oxide surface of said washer, said unit comprising a tinned lead washer secured to an auxiliary contact washer by heat and pressure, said lead washer being disposed adjacent the oxide surface of said rectifier washer and having a smaller outside and a larger inside diameter than the oxide surface of said rectifier washer, and said auxiliary washer having the same outside diameter as the lead washer and the same inside diameter as the copper oxide washer, whereby said lead washer is automatically centered with respect to the oxide surface of said copper oxide washer.

10. An electrical rectifier comprising a perforated disc provided on one side with a coating which forms a rectifying junction, and means for making contact with said coating comprising a tinned lead washer secured by heat and pressure to an auxiliary washer in concentric relation thereto, said lead washer being disposed in contact with said coating and said auxiliary washer being provided with means for maintaining it in concentric relation to said disc.

CONRAD H. ZIERDT, JR.